United States Patent [19]

Baskall

[11] 4,120,336
[45] Oct. 17, 1978

[54] TRACTION DEVICE FOR POWER DRIVEN VEHICLES

[76] Inventor: William C. Baskall, 10520 Pierson Cir., Broomfield, Colo. 80020

[21] Appl. No.: 727,224

[22] Filed: Sep. 27, 1976

[51] Int. Cl.² ............................................. B60C 27/02
[52] U.S. Cl. ..................................... 152/216; 152/221
[58] Field of Search ................... 152/216, 214, 213 R, 152/213 A, 221, 222; 301/40 S, 46, 47, 41 R

[56] References Cited

U.S. PATENT DOCUMENTS

| 1,256,160 | 2/1918 | Parish | 152/216 |
| 2,221,838 | 11/1940 | Kane | 301/47 |
| 2,754,874 | 7/1956 | Gardner | 152/216 |
| 3,071,173 | 1/1963 | Hoffmann | 152/216 |
| 3,318,356 | 5/1967 | Vust | 152/216 |

Primary Examiner—Robert B. Reeves
Assistant Examiner—Francis J. Bartuska
Attorney, Agent, or Firm—Kyle W. Rost

[57] ABSTRACT

A traction device having a base that attaches to the wheel of a vehicle and a shaft projecting from the base has a moveable member on the shaft that forces a traction member to cover a portion of the tire tread when extra traction is desired, as in ice and snow. The traction member may be attached either to the base, in which case the moveable member pushes against it to radially spread it, or to the moveable member itself, in which case the device is moved toward the tire and spread at the time it is engaged.

4 Claims, 8 Drawing Figures

TRACTION DEVICE FOR POWER DRIVEN VEHICLES

BACKGROUND OF THE INVENTION

1. Field of the Invention

The invention relates to land vehicles, wheels and axles. More specifically, the invention is an attachment to the wheels of a vehicle for giving traction to the tires in conditions of mud, snow, or ice in the vehicle's path.

2. Description of the Prior Art

Land vehicles have long had traction problems when weather conditions made road surfaces slippery, for example muddy or snow and ice covered. Conventional vehicles such as cars, trucks, busses, and tractors ride on round tires that depend on tread design to provide traction over slippery surfaces, while unconventional vehicles such as earth moving equipment are often supplied with belt-style tread. The present invention relates to conventional vehicles, hereinafter referred to as cars.

Prior art devices to provide traction to cars traveling over slippery surfaces have included such well known items as tire chains and studded tires. Both of these traction giving means are known to work well, but each has disadvantages. Tire chains are difficult to put on the tires and severely limit the speed of the car. In addition, the motorist often must install the chains while his car is in deep snow and the weather is cold, making the job messy and unpleasant. The motorist must place the chains on the ground, drive over them, and manually wrap the chain around the tire and fasten links together. This operation not only spreads snow or mud over the motorist, but requires that his car be able to move or that he jack up the wheels in order to bring the chain under the wheels. This great inconvenience is a major problem with the use of tire chains.

Studded tires provide improved traction on hard, icy surfaces and do not require the motorist to do more than purchase the studded ties before use. Many states, however, limit or prohibit the use of studded tires because the studs wear highway surfaces at a rapid rate. The fact that the studs are constantly in contact with the road surface regardless of road and weather conditions is a disadvantage that may lead to studded tires being outlawed in all states in the future. Accordingly, there is a need for a traction device that is convenient to install and use when road conditions so require, and that will not be constantly wearing highway surfaces in non-slippery weather.

Some devices in the prior art provide extendable and retractable traction studs suited for use in mud, for example on tractor wheels. U.S. Pat. No. 965,681 to Bagnell and No. 1,537,491 to Palmer are representative of such art. Tires using such pawls or studs as in the cited patents have never been successful because the studs lack flexibility needed to withstand the distortion of modern pneumatic tires on cars traveling at high speed. Furthermore, attachments of the kind in the cited patents are unsuited to fit automobiles with fenders surrounding much of the wheel well. In addition, such attachments lack the strength to provide friction against the ground.

Another severe problem with retractable studs is that the studs transmit road vibration and stress directly to their own hub, which is attached to the side of the regular car wheel. The full downward force of the studs against the road is thus transmitted through the union of the stud wheel hub and regular wheel, the connection being perpendicular to the plane of the rotation of the stud wheel. This arrangement is mechanically undesireable because of the relatively great stresses that can be transmitted to the union of the regular and stud wheels, and alternatively, because of the relatively small amount of traction giving force that the stud wheel hub can be expected to support. The present invention overcomes these and other problems seen in the prior art.

SUMMARY OF THE INVENTION

The invention is an engagable and retractable traction device for car wheels that attaches to the hub of the car wheels and, when engaged, extends traction giving members under the tread of car wheel. When in retracted position, the device is positioned on the side of the tire and wheel, allowing the tire to contact the road surface in the normal way.

An object of the invention is to provide a traction device for cars that combines the advantages of tire chains and studded tires while eliminating the disadvantages of each. Like tire chains, the present device provides a traction giving surface that fits under the car tires and can be used only when road conditions so require. Like studded tires, the present device may be installed on the car with the ease of changing a tire and can remain on the car as long as the motorist desires, for example, throughout the winder, without severely limiting the operational speed of the car. The disadvantages of chains and studded tires are eliminated because the present device can be retracted from road contact without great effort, and can be restored to road contact in a clean and simple way.

An important object is to provide a traction device that can be attached to ordinary vehicle wheels on modern cars. The traction device may fit close to the side of a car wheel and tire and within close fitting fenders.

Another object is to provide a traction device that takes advantage of the weight of the vehicle to provide traction. While stud wheels known in the prior art operated laterally to the vehicle tire, the present device covers a portion of the tire tread and is pressed against the road surface by the weight of the vehicle as transmitted directly through the vehicle tire. As a result, the hub of the traction device does not bear the full impact of road vibrations. Vibration is passed directly to the vehicle tire, where the vehicle's suspension system can act in the normal way to dampen shock. As a result, the present device remains operable under conditions that would tear prior art devices from the vehicle.

DESCRIPTION OF THE PREFERRED EMBODIMENT

Figure 1:
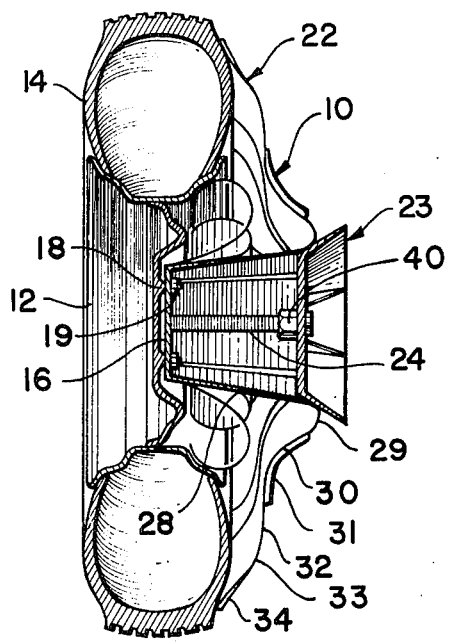
FIG. 1 is a sectional view of a wheel and tire having an embodiment of the traction device installed in retracted position.
Figure 2:
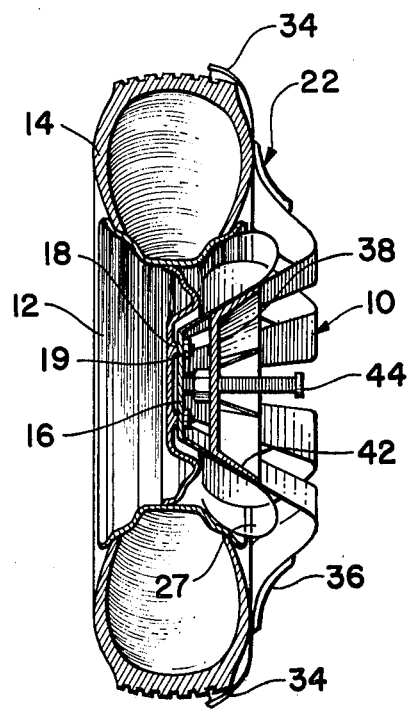
FIG. 2 is a view similar to FIG. 1, but showing the traction device in operative position.
Figure 3:
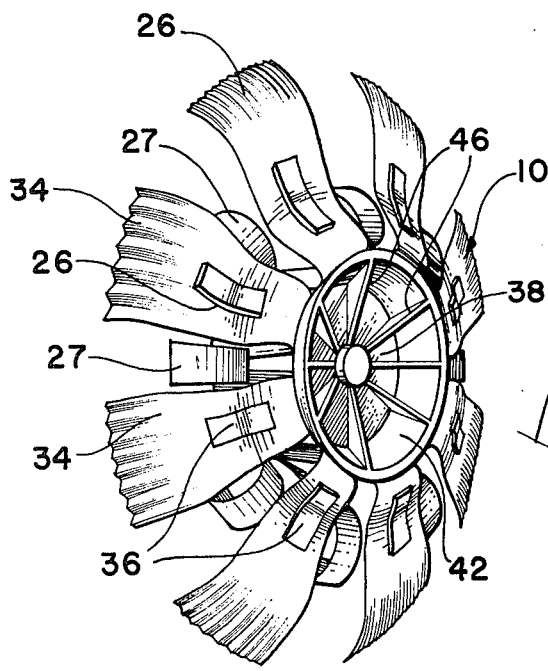
FIG. 3 is an isometric view of the embodiment of the invention shown in FIGS. 1 and 2.
Figure 4:
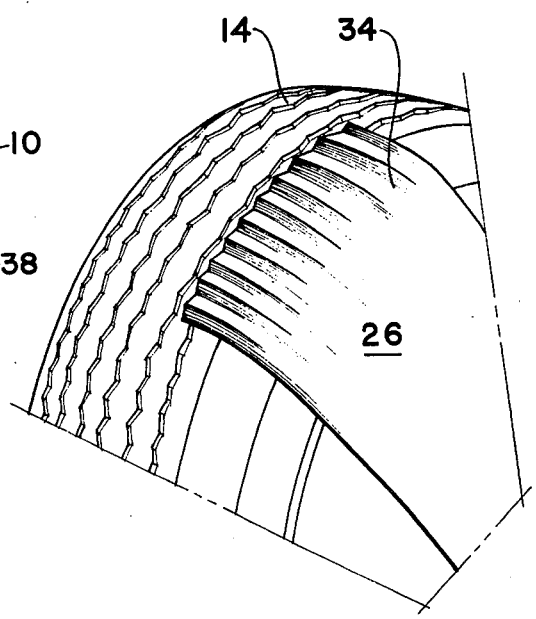
FIG. 4 is an enlarged perspective view showing a portion of the traction device covering the tire tread.

The traction device 10 is an attachment for use with a wheel 12 and tire 14 as commonly found on automobiles and the like. An attaching base, for example base plate 16 in FIGS. 1-3, provides a mounting area for securing the traction device to the wheel 12, for example with lug bolts 18 and lug nuts 19. Connected to the attaching base is a traction member, for example traction disk 22, capable of being moved to cover a part of the tire tread as shown in FIG. 4. Engaging means, such as camming member 23 threadedly mounted on shaft 24 causes the traction member to be moved into engaged position covering a portion of the tire tread or allows the traction member to be in retracted position, not covering the tire tread.

Base plate 16 preferably is attached to the automobile by sharing lug bolts with wheel 12. The plate is provided with holes aligned to match the lug bolt pattern of the car, but may be attached at only three of the bolts, thus allowing the traction device to be mounted on the car without jacking. The holes at the lug bolt positions not used for fastening the traction device are enlarged to an appropriate size to pass around the lug nut still tightened against wheel 12. Three point support is desired to hold plate 16 in a single plane, but more fastening points may be used if desired.

Traction disk 22 may be integral with base plate 16 or may be connected to it, for example by welding. Disk 22 is preferably constructed of spring steel or other strong, flexible material stamped and formed into the desired configuration. A plurality of traction arms 26, for example eight, radiate evenly from base 16 and a similar number of spring arms 27, which may be cut from between traction arms 26 in the forming process, may be retained between arms 26. As shown in FIGS. 1 and 3, arms 26 have a portion 28 angling axially outwardly from base 16 to curve 29; portion 30 then angles axially inwardly and radially outwardly, for example at 45° to the plane of base 16, to curve 31; portion 32 angles radially outwardly to curve 33; and portion 34 angles axially inwardly and radially outwardly, for example at 50° to the plane of base 16. This configuration has yield points at curve 31 and curve 33 in response to radially inwardly directed pressure on portion 34. Reinforcing means 36 is attached to curve 31, making curve 33 the more yieldable of the two. Thus, when traction arms 26 are in engaged position as shown in FIG. 2, portion 34 will fold under the rolling tire between the tire tread and the roadway as traction arm 24 bends at curve 33. Portion 34 is corrugated, as shown in FIG. 3, to provide traction on slippery surfaces.

Spring arms 27 are curved in a radially outwardly directed curve and rest in part against the rim of wheel 12. The spring arms provide stability for the traction device 10 against wheel 12 and assist in preventing buckling in portion 28 when the traction device is in engaged position. In addition, when the traction device is disengaged, spring arms urge traction arms 26 into retracted position.

The engaging means either allows traction disk 22 to assume the position shown in FIG. 1 or forces the disk into engaged position as shown in FIG. 2. Camming member 23 has relatively narrow plate 38 with a threaded portion 40 mounted on threaded shaft 24. The annular side 42 flares axially and radially outwardly from plate 38, forming a conical shape that acts as a wedge spreading portions 28 of the traction arms 26 as plate 38 is screwed toward wheel 12 on shaft 24. The spreading of portions 28 urges the traction arms 26 to extend beyond the diameter of tire 14, causing portion 34 to fold between the tire 14 and the roadway, as above described. Shaft 24 is attached to base plate 16 at its axially inward end and has retaining means such as flange 44 at its axially outward end for preventing member 23 from spinning off shaft 24. Member 23 is equipped with grip means such as interior vanes 46 providing a hand hold for turning the camming member 23 into or out of engaged position. Locking means (not shown) such as a spring pin may fasten camming member 23 against unauthorized rotation, for example by extending through side 42 and between two of the traction arms, or alternatively, by extending through portion 40 into a keyway or predrilled hole in shaft 24.

In operation, the traction device 10 may be attached to wheel 12 as above described with camming member 23 in the position shown in FIG. 1. Traction disk 22 will fit between the fender and tire 14 on most cars, allowing the device to be mounted on the car for long periods without causing interference in normal operation of the car. When road conditions require added traction, the motorist quickly and easily engages the traction device by rotating camming member 23 until it is in the position shown in FIG. 2, urging traction arms 26 to extend beyond the radius of tire 14. The corrugated portions 34 partially underlie the tire tread to provide the needed traction. Road vibrations are dampened with respect to the traction device because of the firm contact between the traction arm, road, and tire. Thus, base plate 16 receives a relatively small amount of shock and stress when the device is engaged. In addition, the flexible nature of traction arms 26 insulates base plate 16 from shock. When road conditions no longer require extra traction, the motorist quickly and easily disengages the traction device by rotating camming member 23 in the opposite direction, returning it to the position shown in FIG. 1. The traction arms will return to retracted position, those caught between the road and the tire returning to retracted position when the car is next moved.

Figure 5:
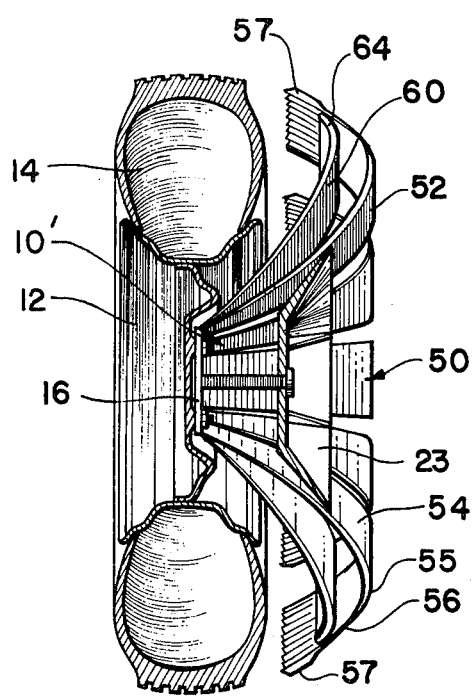
FIG. 5 is a sectional view showing a second embodiment of the traction device in retracted position.
Figure 6:
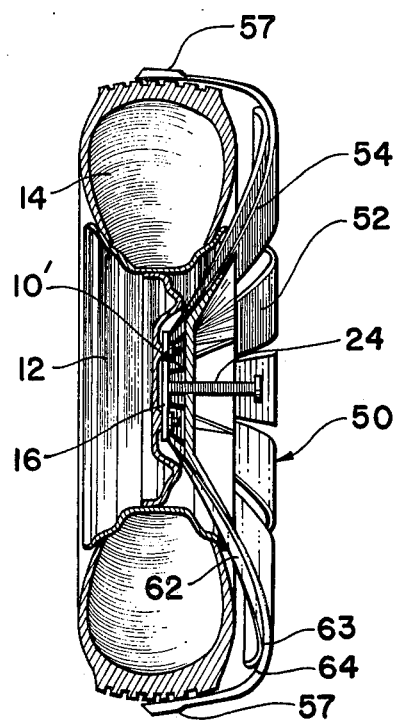
FIG. 6 is a view of the traction device of FIG. 5 in operative position.

A second embodiment labeled 10' is shown in FIGS. 5 and 6 and is suited for use on vehicles not having narrow fender wells. Parts similar to those described in the first embodiment are similarly numbered. Traction disk 50 is attached to base plate 16 and is moved to engaged position by operating camming member 23 on shaft 24 as previously described. Disk 50 is formed into traction arms 52, for example eight, radiating evenly from base plate 16. Each arm 52 has a portion 54 extending radially and axially outwardly from plate 16 to curve 55; then portion 56 angles radially outwardly and axially inwardly to its end 57, which is corrugated to provide added traction. Spring arms 60, which may be formed from the disk material cut from between arms 52 in the forming process, also radiate evenly from base plate 16 and are positioned intermediate arms 52. Each spring arm has a portion 62 extending radially and axially outwardly from base plate 16 to curve 63. Arms 60 are shorter than arms 52 and may terminate at curve 63 with a slight radially outwardly, axially inwardly curving tip 64 on curve 63. Tip 64 supports arm 52 under tip 57 when the device is in retracted position and adds stability to traction disk when the car is in motion, preventing centrifugal force from bringing arms 52 into contact with the road surface. When the camming member 23 releases traction arms 52 from engaged position, spring arms 60 urge traction arms 52 to return to retracted position.

Traction device 10' brings traction arm tips 57 over the tire tread without the need for a yielding curve as described for the first embodiment 10. The shape of traction arms 52 allows tip 57 to be pivoted over a portion of the tire tread from the camming action of camming member 23 acting on portion 54.

Figure 7:
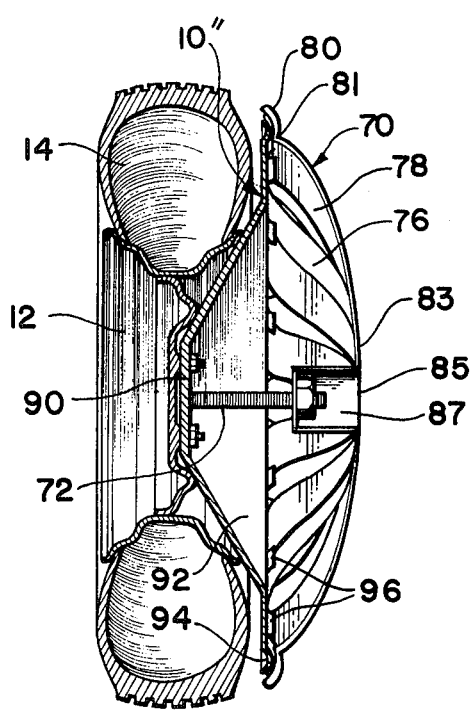
FIG. 7 is a sectional view of a third embodiment of the traction device in retracted position.
Figure 8:
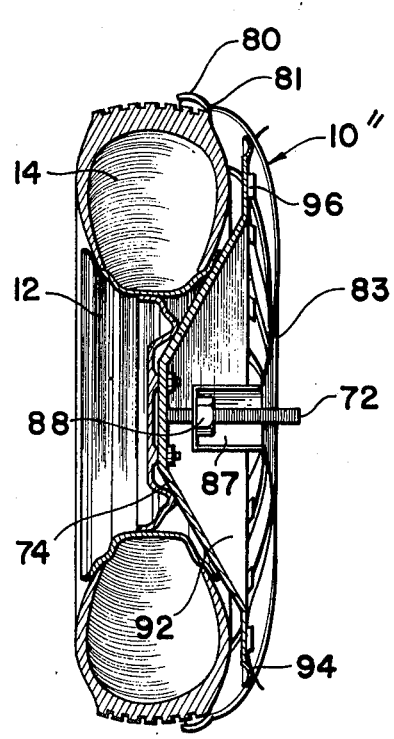
FIG. 8 is a view of the traction device shown in FIG. 7 in operative position.

A third embodiment 10" is shown in FIGS. 7 and 8. Traction disk 70 is formed into a natural dome shape and is engaged or retracted by moving the dome toward or away from wheel 12 on adjusting shaft 72, which is connected to a backing plate 74 that attaches to the lug bolts of the car as described above. Spring arms 76 act as antirotation means preventing disk 70 from rotating independently of wheel 12.

Disk 70 is formed from a single sheet of metal stamped into a dome shape and split along radial lines to form a plurality of traction arms 78 and spring arms 76. The traction arms are further formed to have corrugated tips 80, and the tips 80 are bent slightly radially outwardly from the dome shape. The bent area just inside the corrugated tips is a naturally yieldable area 81. The central portion 83 of disk 70 is not split but has a central opening 85 connected to a mounting well 87, which allows disk 70 to be connected to the wheel 12 on a relatively short shaft 72. Adjusting means such as nut 88 in well 87 is threadedly connected to shaft 72 and may be rotated by means of a deep socket or the like.

Backing plate 74 has a base portion 90 that connects to wheel 12 and a support portion 92 that connects to base portion 90 and extends over a portion of tire 14 to support the disk 70 when it is in retracted position, as shown in FIG. 7. The outer portion of backing plate 74 is an annular rib 94 that both acts as a form fitting support for tips 80 and serves as a yieldable area that can collapse to prevent excessive damage to the car, tire or traction device if tire 14 should flatten while the traction device 10" is installed on the car.

Spring arms 76 bend inwardly from the dome of disk 70 and contact support portion 92 of the backing plate radially within rib 94. Spring arm fastening means such as protruding tabs 96 raised from the surface of backing plate 74 on each side of each spring arm 76 lock the spring arms and thereby the entire traction disk into a single rotational position with respect to wheel 12 and tire 14. Thus, the spring arms are anti-rotation means that prevent independent rotation of the traction disk and tire 14. In addition, the spring arms urge the disk 70 into retracted position when the adjusting means so allows.

In operation, traction device 10" is engaged by tightening nut 88 on shaft 72 and thereby drawing the central portion 83 of disk 70 toward wheel 12. As central portion 83 is drawn toward wheel 12, tips 80 of traction arms 78 are forced off of their resting place on backing plate rib 94 and the tips then assume their natural contour, shown in FIG. 8, angling over the tread of tire 14. Spring arms 76 may slide between tabs 96 as they are compressed with disk 70 but they maintain their anti-rotation function. Traction device 10" is disengaged by retracting nut 88, allowing disk 70 to assume its dome shape and draw traction arm tips 80 over rib 94.

I claim:

1. A traction device for use on a vehicle having a wheel and tire assembly connected to the vehicle, comprising:
    (a) base means connectable to said wheel and tire assembly;
    (b) a traction member connected to said base means having a predetermined first configuration and being flexible enough to be deformed into a second configuration, the traction member fitting within the diameter of and along side said wheel and tire assembly when in the first configuration and extending beyond the diameter of the wheel and tire assembly and covering at least a portion of the tire tread when in said second configuration;
    (c) engaging means attached to said base means and contacting said traction member, the engaging means being selectively moveable to urge the traction member from the first configuration into the second configuration or to release the traction member from the second configuration, the engaging means comprising a shaft perpendicularly attached to said base means and an adjusting member axially moveable thereon;
    (d) the traction member comprising a dome-shaped member having its concave side facing the tire and wheel assembly and having its central area attached to said adjusting member, the outer rim of said dome-shaped member covering a portion of the tire tread when the adjusting member moves the dome-shaped member axially toward the tire and wheel assembly into said second configuration.

2. The traction device of claim 1, further comprising anti-rotation means for preventing said traction member from rotating independently of said tire and wheel assembly.

3. A traction device for use on a vehicle having a wheel and tire assembly connected to the vehicle comprising
    (a) base means connectable to said wheel and tire assembly;
    (b) a traction member connected to said base means having a substantially undeformed predetermined inoperative configuration and being flexible enough to be deformed into an operative configuration, the traction member fitting within the diameter of and along side said wheel and tire assembly when in the inoperative configuration and extending beyond the diameter of the wheel and tire assembly and covering at least a portion of the tire tread when in said operative configuration, wherein said traction member further comprises a plurality of traction arms connected to said base means and forming a unitary structure therewith, the traction arms spreading therefrom in a radial pattern, each arm having an end portion angling toward the tire and wheel assembly and having a yieldable curved portion located radially inwardly therefrom and resiliently bendable under pressure from contact between the end portion and the roadway when the traction member is in said operative configuration to direct the end portion under the tire tread between the tire and the roadway; and
    (c) engaging means attached to said base means and contacting said traction member, the engaging means being selectively moveable to urge the traction member from the inoperative configuration into the operative configuration or to release the traction member from the operative configuration.

4. A traction device for use on a vehicle having a wheel and tire assembly connected to the vehicle comprising
   (a) base means connectable to said wheel and tire assembly;
   (b) a traction member connected to said base means having a substantially undeformed predetermined inoperative configuration and being flexible enough to be deformed into an operative configuration, the traction member fitting within the diameter of and along side said wheel and tire assembly when in the inoperative configuration and extending beyond the diameter of the wheel and tire assembly and covering at least a portion of the tire tread when in said operative configuration, wherein said traction member further comprises a plurality of traction arms connected to said base means and forming a unitary structure therewith, the traction arms spreading therefrom in a radial pattern, each arm having a first and inner portion angling radially and axially away from said tire and wheel assembly and having a second and outer portion connected to said first portion and angling toward the outer circumference of the tire and wheel assembly, each arm being directly urged by said engaging means to deform along the inner portion of the traction arm to bring the end of said second portion over a portion of the tire tread when the engaging means urges the traction member into said operative position; and
   (c) engaging means attached to said base means and contacting said traction member, the engaging means being selectively moveable to urge the traction member from the inoperative configuration into the operative configuration or to release the traction member from the operative configuration.

* * * * *